United States Patent
Teng et al.

(10) Patent No.: US 11,757,928 B2
(45) Date of Patent: Sep. 12, 2023

(54) DISTRIBUTED DENIAL-OF-SERVICE MITIGATION

(71) Applicant: Equinix, Inc., Redwood City, CA (US)

(72) Inventors: Juxiang Teng, Walnut Creek, CA (US); Muhammad Durrani, San Jose, CA (US); Rupinder Singh Randhawa, Livermore, CA (US)

(73) Assignee: EQUINIX, INC., Redwood City, CA (US)

( * ) Notice: Subject to any disclaimer, the term of this patent is extended or adjusted under 35 U.S.C. 154(b) by 84 days.

(21) Appl. No.: 17/009,283

(22) Filed: Sep. 1, 2020

(65) Prior Publication Data

US 2021/0084068 A1 Mar. 18, 2021

Related U.S. Application Data

(60) Provisional application No. 62/901,536, filed on Sep. 17, 2019.

(51) Int. Cl.
*H04L 29/06* (2006.01)
*H04L 9/40* (2022.01)
(Continued)

(52) U.S. Cl.
CPC ...... *H04L 63/1458* (2013.01); *H04L 12/4641* (2013.01); *H04L 12/66* (2013.01);
(Continued)

(58) Field of Classification Search
CPC . H04L 63/1458; H04L 63/0236; H04L 63/20; H04L 2463/141; H04L 12/4641; H04L 12/66; H04L 45/122
(Continued)

(56) References Cited

U.S. PATENT DOCUMENTS 9,948,552 B2   4/2018   Teng et al.
10,015,268 B2  7/2018   Rao
(Continued)

FOREIGN PATENT DOCUMENTS

WO   2004090741 A2   10/2004

OTHER PUBLICATIONS

International Preliminary Report on Patentability from International Application No. PCT/US2020/051037, dated Mar. 31, 2022, 11 pp.
(Continued)

*Primary Examiner* — Evans Desrosiers
(74) *Attorney, Agent, or Firm* — Shumaker & Sieffert, P.A.

(57) ABSTRACT

The techniques described in this disclosure provide resilient and reactive on-demand Distributed Denial-of-Service (DDoS) mitigation services using an exchange. For example, an exchange comprises a first virtual network for switching mixed traffic (including dirty (DDoS) traffic and clean (non-DDoS) traffic)) from one or more networks to one or more DDoS scrubbing centers; and a second virtual network for switching the clean traffic from the one or more DDoS scrubbing centers to the one or more networks, wherein the exchange is configured to receive the mixed traffic from the one or more networks and switch, using the first virtual network, the mixed traffic to a selected DDoS scrubbing center of the one or more DDoS scrubbing centers, and wherein the exchange is configured to receive the clean traffic from the selected DDoS scrubbing center and switch, using the second virtual network, the clean traffic to the one or more networks.

20 Claims, 6 Drawing Sheets

(51) Int. Cl.
*H04L 12/46* (2006.01)
*H04L 45/122* (2022.01)
*H04L 12/66* (2006.01)

(52) U.S. Cl.
CPC ........ *H04L 45/122* (2013.01); *H04L 63/0236* (2013.01); *H04L 63/20* (2013.01); *H04L 2463/141* (2013.01)

(58) Field of Classification Search
USPC .......................................................... 726/22
See application file for complete search history.

(56) References Cited

U.S. PATENT DOCUMENTS

| | | |
|---|---|---|
| 2013/0227670 A1 | 8/2013 | Ahmad et al. |
| 2016/0080411 A1 | 3/2016 | Jain |
| 2017/0237767 A1* | 8/2017 | George ............... H04L 63/1416 726/23 |
| 2018/0302436 A1* | 10/2018 | Williamson .......... H04L 63/205 |

OTHER PUBLICATIONS

International Search Report and Written Opinion of International Application No. PCT/US2020/051037, dated Nov. 13, 2020, 18 pp.

"DDoS Mitigation Service," Internet2, Retrieved Jan. 12, 2021 from: https://web.archive.org/web/20191102214015/https://www.internet2.edu/products-services/advanced-networking/ddos-mitigation-service/, accessed Nov. 2, 2019, 2 pp.

Van de Velde, "BGP DDoS Mitigation," Cisco Systems, May 2013, 36 pp.

"Integrating Cisco Anomaly Guard Module and VRF-Lite," Cisco Security, Retrieved from: https:/tools.cisco.com/security/center/resources/integrating_anomaly_guard_vrf, last accessed date Jan. 12, 2021, 11 pp.

"DDoS Protector," Liberouter/ Cesnet TMC group, Retrieved Jan. 12, 2021 from: https://web.archive.org/web/20200806093518/https://www.liberouter.org/technologies/ddos-protector/, accessed Aug. 6, 2020, 2 pp.

Communication Pursuant to Rules 161(1) and 162 EPC dated Dec. 22, 2020 from counterpart European Application No. 20781255.3, 3 pp.

Response to Communication pursuant to Article 94(3) EPC dated Jun. 10, 2022, from counterpart European Application No. 20781255.3 filed Oct. 4, 2022, 67 pp.

Communication pursuant to Article 94(3) EPC from counterpart European Application No. 20781255.3 dated Jun. 10, 2022, 10 pp.

First Office Action and Search Report, and translation thereof, from counterpart Chinese Application No. 202080003438.9 dated Jul. 1, 2023, 11 pp.

\* cited by examiner

DISTRIBUTED DENIAL-OF-SERVICE MITIGATION

This application claims the benefit of U.S. Provisional Application No. 62/901,536 filed Sep. 17, 2019, the entire content of which is incorporated by reference.

TECHNICAL FIELD

This disclosure relates to computer networks and, more specifically, to network exchanges such as Internet exchanges.

BACKGROUND

A network services exchange provider or colocation provider (a "provider") may employ a communication facility, such as a data center or warehouse, in which multiple customers of the provider locate network, server, and storage gear and interconnect to a variety of telecommunications, cloud, and other network service provider(s) with a minimum of cost and complexity. Such customers are said to be "colocated" in the data center. Data centers may be shared by the multiple tenants locating networking equipment within the data centers. By using colocation facilities of the provider, customers of the provider including telecommunications providers, Internet Service Providers (ISPs), application service providers, service providers, content providers, and other providers, as well as enterprises, enjoy high flexibility, less interconnection latency, and therefore can focus on their core business.

In some cases, the communication facility provides interconnection services by which customers of the provider may interconnect to one another over the communication facility infrastructure or by which a customer of the provider may interconnect its spatially and/or geographically distributed customer networking equipment over the communication facility infrastructure. The communication facility may in such cases be referred to as an "interconnection facility" or "colocation facility." The facility provider may provide services accessible to colocated customers via an interconnection, such services including, for example, a cloud exchange, Internet access, an Internet exchange, "metro connect" for reaching other communication facilities of the provider within a metropolitan area, a cross-connect from one customer to another, and other interconnection services.

SUMMARY

In general, techniques are described for resilient and reactive on-demand Distributed Denial-of-Service (DDoS) mitigation services using an exchange. For example, an exchange point (e.g., Internet exchange point) allows networks to directly peer with one another. Networks, such as ISP networks, unwittingly transport a mix of DDoS (dirty) traffic and non-DDoS (clean) traffic and may attempt to mitigate the dirty traffic using cloud-based DDoS scrubbing services.

In one example implementation of the techniques, an exchange is configured with separate virtual networks for clean and dirty traffic exchanged between networks and the cloud-based scrubbing services. For example, the exchange may be configured with a dirty Virtual Local Area Network (VLAN) for the mix of clean and dirty traffic sent by a network to the scrubbing service for mitigation. The exchange may be configured with a separate clean VLAN by which the scrubbing service may return the clean traffic to the network for forwarding to its destinations.

More specifically, in some examples, an administrator (such as an operator or software agent) for an ISP network or a downstream network (between the ISP network and the destinations) may determine that a set of one or more destinations (e.g., a destination prefix) is subject to a DDoS attack. Traffic to that set of destinations is therefore a mix of clean and dirty traffic. In response to this determination, the administrator may configure the network to reroute mixed traffic, via a gateway of the network and using the dirty VLAN, to DDoS scrubbing centers via the exchange, which in turn switches the mixed traffic to DDoS scrubbing centers to mitigate DDoS attacks and thereby generate clean traffic. The DDoS scrubbing center may return, using the clean VLAN, the clean traffic via the exchange to the network, which in turn sends the clean traffic to its destinations. The administrator may request, via a portal or other interface, that the network for the DDoS scrubbing center advertise itself to the ISP network as a destination for the set of destinations by, e.g., sending routing protocol route advertisements via the exchange using the dirty VLAN. In this way, the ISP network uses standard routing protocols to direct dirty traffic to the DDoS scrubbing center, rather than, e.g., a tunnel.

The techniques of the disclosure may provide one or more technical advantages having at least one practical application. For example, switching traffic through an exchange via separate dirty and clean VLANs facilitates a clean separation and isolation between clean and dirty traffic. In addition, using clean and dirty VLANs enables the ISP network to select among multiple different DDoS scrubbing centers that may be provided by different cloud service provider networks, thereby providing scalability in handling larger volume attacks. The techniques in effect provide parallel exchanges for clean traffic among ISP networks and the DDoS scrubbing centers and for dirty traffic among ISP networks and the DDoS scrubbing centers. Still further, whereas existing solutions for transporting clean and dirty traffic among ISPs and DDoS scrubbing centers involve tunneling (e.g., using a generic route encapsulation (GRE) tunnel) of the clean traffic back to the ISP network or a downstream network, the techniques herein avoid the use and overhead of tunneling. In this way, overhead and/or data fragmentation resulting from tunnels may be prevented. Dedicated cross-connects or virtual circuits between ISP networks, DDoS scrubbing centers, and/or downstream networks for separately transporting clean or dirty traffic are also not needed, thereby reducing costs.

In one example of the techniques described herein, an exchange comprising: a first virtual network for switching mixed traffic from one or more networks to one or more Distributed Denial of Service (DDoS) scrubbing centers, wherein the mixed traffic includes dirty traffic that represents DDoS traffic and clean traffic that represents non-DDoS traffic; and a second virtual network for switching the clean traffic from the one or more DDoS scrubbing centers to the one or more networks, wherein the exchange is configured to receive the mixed traffic from the one or more networks and switch, using the first virtual network, the mixed traffic to a selected DDoS scrubbing center of the one or more DDoS scrubbing centers, and wherein the exchange is configured to receive the clean traffic from the selected DDoS scrubbing center and switch, using the second virtual network, the clean traffic to the one or more networks.

In another example of the techniques described herein, a method includes configuring, by a policy unit for an exchange, the exchange to implement a first virtual network for switching mixed traffic from one or more networks to one or more Distributed Denial of Service (DDoS) scrubbing centers, wherein the mixed traffic includes dirty traffic that represents DDoS traffic and clean traffic that represents non-DDoS traffic; and configuring, by the policy unit, the exchange to implement a second virtual network for switching the clean traffic from the one or more DDoS scrubbing centers to the one or more networks.

In another example of the techniques described herein, a system comprising: one or more networks connected to an exchange via a gateway device; one or more Distributed Denial of Service (DDoS) scrubbing centers connected to the exchange via one or more provider edge devices; the exchange; and a policy unit for the exchange, wherein the policy unit is configured to: configure the exchange to implement a first virtual network for switching mixed traffic from the one or more networks to a selected DDoS scrubbing center of the one or more DDoS scrubbing centers, wherein the mixed traffic includes dirty traffic that represents DDoS traffic and clean traffic that represents non-DDoS traffic; and configure the exchange to implement a second virtual network for switching the clean traffic from the one or more DDoS scrubbing centers to the one or more networks.

The details of one or more techniques of the disclosure are set forth in the accompanying drawings and the description below. Other features, objects, and advantages of the invention will be apparent from the description and drawings, and from the claims.

BRIEF DESCRIPTION OF DRAWINGS

Like reference characters denote like elements throughout the figures and text.

DETAILED DESCRIPTION

Figure 1:
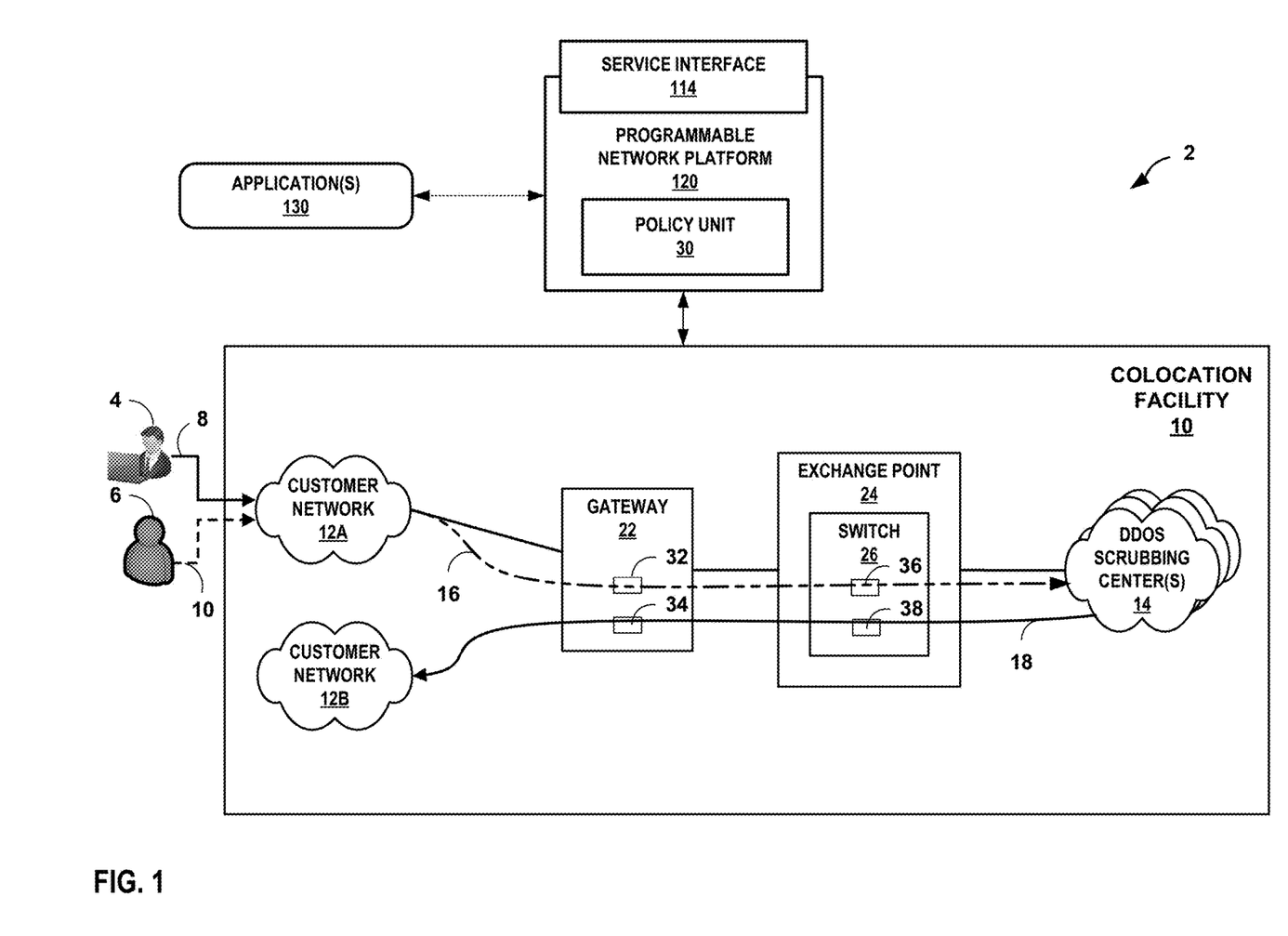
FIG. 1 is a block diagram that illustrates an interconnection system that provides resilient and reactive on-demand DDoS mitigation services using an exchange, in accordance with techniques of the disclosure.

FIG. 1 is a block diagram that illustrates an interconnection system 2 that provides resilient and reactive on-demand DDoS mitigation services using an exchange, in accordance with techniques described herein. In the example of FIG. 1, interconnection system 2 depicts an exchange point 24 within a colocation facility 10 that provides network services to customer networks 12A, 12B (collectively, "customers 12" or "customer networks 12") to, for instance, exchange data with one another via the exchange point. Although FIG. 1 is shown with two customers, interconnection system 2 may include one or more additional customers colocated in the colocation facility 10 to receive network services from the colocation facility 10 provider. As used herein, the term "customer" may refer to a tenant of a colocation facility deployed by a colocation facility provider, whereby the customer purchases colocation, interconnection and other network services from the colocation facility provider, and receives such services by colocating within the colocation facility 10 to, e.g. lease space and/or power to access services provided at colocation facility 10. Interconnection system 2 includes exchange point 24 deployed by the colocation facility 10 provider within the colocation facility 10 to interconnect and provide other network services to customer networks 12.

In colocation facility 10, space and power may be partitioned and leased to customers 12 in flexible increments in the form of cages (an area of a common floor space enclosed by a fence or other demarcation), cabinets, racks, suites (an enclosed room that is not part of a common floor space), or other space in which customers may situate their network equipment to provide and/or receive network services to/from other customer(s) colocated in the colocation facility 10. Customers 12 may lease space within the colocation facility 10 in order to colocate with other tenants for improved efficiencies over independent facilities as well as to interconnect network equipment with the network equipment of other tenants/customers within the colocation facility 10 or campus for reduced latency/jitter and improved reliability, performance, and security versus transport networks, among other reasons. Colocation facility 10 may host numerous customers, e.g., customers 12, and their network, server, and/or storage gear. Each of customers 12 may have particular reasons for choosing to colocate at colocation facility 10, including capacity, geographical proximity, connecting to other customers, colocating with other customers, and price.

Customer networks 12 may each represent a cloud service provider ("CSP"), a network service provider/carrier ("NSP"), and/or an enterprise. Customers networks 12 of colocation facility 10 may interconnect for such end-uses as service delivery, content delivery, financial services, and Internet access, to give just a few examples.

Co-location facility 10 may provide one or more different types of interconnection services via network devices of a network infrastructure between customers 12 colocated in colocation facility 10. For instance, colocation facility 10 may provide physical or "layer-1" (in the Open Systems Interconnection model (OSI Model)) interconnections between customers 12. Physical interconnections may include physical cross-connects that are established by category 5 or 6 (cat 5/6) cables, coaxial cables, and/or fiber optic cables, for instance. In some examples, colocation facility 10 may provide data link or "layer-2" (in the OSI Model) interconnections between customers 12. In some examples, colocation facility 10 that provides layer-2 interconnections may be referred to as an Ethernet Exchange, where Ethernet is the underlying layer-2 protocol. In some examples, colocation facility 10 may provide network and/or transport or "layer-3/4" (in the OSI Model) interconnections between customers 12. In some examples, colocation facility 10 may provide layer-3/4 interconnections (referred to an Internet Exchange), where TCP/IP is the underlying layer-3/4 protocols. For example, colocation facility 10 may provide an Internet Exchange to allow routers of customers 12 to directly peer with one another using a layer-3 routing protocol, such as Border Gateway Protocol, to exchange routes for facilitating layer-3 traffic exchange to provide private peering. In some examples, colocation facility 10 may provide indirect layer-3 routing protocol peering whereby each of customers 12 announces its layer-3 routes to an autonomous system (AS) deployed by the colocation facility provider within the colocation facility network infrastructure to provide private peering mediated by the AS. The AS may then relay these routes typically in conjunction with tunneling or other forwarding mechanisms to establish an interconnection between customers 12. In some examples, colocation facility 10 may provide indirect layer-3 routing protocol peering to facilitate service traffic exchange (referred to as a Cloud-based Services Exchange or, more simply, a Cloud Exchange). The various exchanges in this disclosure are simply referred to herein as "exchanges." Additional description of exchanges is found in U.S. patent application Ser. No. 15/099,407, filed Apr. 14, 2016, entitled "CLOUD-BASED SERVICES EXCHANGE," and U.S. patent application Ser. No. 15/001,766, filed Jan. 20, 2016, entitled "MULTI-CLOUD, MULTI-SERVICE DATA MODEL," the entire content of each of which being incorporated by reference herein. As used herein, an interconnection is an example of a network service provided by network devices of network infrastructure 20.

Exchange point 24 may peer with customer networks 12 and DDoS scrubbing centers 14 via exterior gateway routing protocols, such as external Border Gateway Protocol (eBGP) to exchange, aggregate, and route service traffic from DDoS scrubbing centers 14 to customer networks 12. In other words, exchange point 24 may internalize the eBGP peering relationships that DDoS scrubbing centers 14 and customer networks 12 would maintain on a pair-wise basis. A customer, e.g., customer network 12A, may configure a single eBGP peering relationship with exchange point 24 and receive, via the exchange, network services, such as DDoS mitigation services, from one or more DDoS scrubbing centers 14. While described herein primarily with respect to eBGP or other layer 3 routing protocol peering between exchange point 24 and customers, exchange point 24 may learn routes from these networks in other ways, such as by static configuration, or via Routing Information Protocol (RIP), Open Shortest Path First (OSPF), Intermediate System-to-Intermediate System (IS-IS), or other route distribution protocol.

Exchange point 24 may provide access to network services in addition or in the alternative to interconnection services. Network services may include one or more of network address translation (NAT) services, firewall services, address allocation, deep packet inspection (DPI), subscriber management, billing and/or policy enforcement, content delivery networking (CDN), and other network services.

In the example of FIG. 1, exchange point 24 includes a network infrastructure and an operating environment by which customers receive network services. In some examples, the network infrastructure of exchange point 24 may include network devices such as, routers and/or switches, e.g., switch 26, to provide customers 12 with access to network services. The number of network devices within exchange point 24 is illustrated for exemplary purposes and may include any number of network devices to provide customers 12 with access to network services of interconnection system 2. Each network device includes a number of resources and features to provide access to the network services. For example, a switch 26 may include network device resources for implementing features offered by the switch, such network device resources including control plane central processing unit ("CPU"), data plane CPU, control plane memory, data plane memory, ports, line cards, and other network device resources. A network device feature may include a logical component of the network device that provides support for a network service and utilizes hardware-based network device resources to implement the network service. For example, network device features may include virtual local area network (VLAN) support and other features supported by network devices to implement network services configured by an operator (either directly or via a configuration device such as a Software Defined Networking (SDN) controller).

In some examples, customers may request one or more network services from the colocation facility 10 provider via programmable network platform 120 ("PNP 120"). PNP 120 may represent an application executing within one or more data centers of interconnection system 2 or alternatively, off-site/remotely at a back office or branch of the colocation facility provider, for instance. Although shown as administering a single colocation facility 10, programmable network platform 120 may control service provisioning for multiple different colocation facilities. Alternatively, or additionally, multiple separate instances of the programmable network platform 120 may control service provisioning for respective multiple different colocation facilities. Programmable network platform 120 may include service interface 114 (or "service application programming interface (API)") that may exchange information with application(s) 130 to receive service requests, for instance. Service interface 114 defines the methods, fields, and/or other software primitives by which one or more applications 130 may invoke programmable network platform 120.

Application(s) 130 represents at least one application that communicates with PNP 120 to request services for a customer. Application(s) 130 represent client-side software for interfacing with PNP 120 and may include a customer portal, customer applications, and/or a console such as a command-line interface or graphical user interface. Users or clients of application(s) 130 may include customers associated with customer networks 12, e.g., enterprise customers, cloud service and content providers (e.g., DDoS scrubbing centers 14, carriers, network service providers (NSPs), or other customers of colocation facility 10. Users of application(s) 130 may also include operators/administrators of the colocation facility 10 provider. In some examples, application(s) 130 and PNP 120 may represent different functions or modules of the same application.

In some examples, network devices of exchange point 24 may provide access to network services, such as CDNs or DDoS cloud service providers that provide DDoS mitigation services for colocated customers. CDNs or DDoS cloud service providers may include one or more DDoS scrubbing centers 14 to filter malicious traffic and prevent the malicious traffic from reaching its target. For example, an attacker 6 may send malicious traffic 10 to overwhelm the network. Malicious traffic 10 may include large packets with large amount of data, small packets in quick succession, packets that require extra processing, or cause the targeted device to waste time waiting for a response that never arrives. Typically, DDoS scrubbing centers require a tunnel (e.g., Generic Route Encapsulation (GRE) tunnel) to send clean traffic to the target network. However, the use of GRE tunneling may result in larger overhead and/or data fragmentation. Alternatively, DDoS scrubbing centers may alternatively use a dedicated cross-connect or virtual circuit over a Multiprotocol Label Switching (MPLS) network per customer to send clean traffic to the target network. However, the use of a dedicated cross-connect or virtual circuit is costly to customers and service providers.

In accordance with techniques of this disclosure, interconnection system 2 may provide a colocation facility 10 that provides resilient and reactive on-demand DDoS mitigation services using an exchange. In the example of FIG. 1, one or more DDoS scrubbing centers 14 may also situate their network equipment in colocation facility 10 to provide network services (e.g., DDoS mitigation services) for other customer(s) colocated in the colocation facility 10.

In the example of FIG. 1, a network device, e.g., switch 26, of exchange point 24 may include a dirty VLAN 36 to switch a mix of DDoS (dirty) traffic to a selected DDoS scrubbing center of the DDoS scrubbing centers 14 and a clean VLAN 38 to switch non-DDoS (clean) traffic to the target network, e.g., customer network 12B. For example, switch 26 of exchange point 24 may associate a first set of ports with dirty VLAN 36 to switch mixed traffic to the DDoS scrubbing centers 14. Switch 26 may also associate a second, different set of ports with clean VLAN 38 to send the clean traffic to customer network 12B.

In some examples, an administrator (such as an operator or software agent) for customer 12A (e.g., an ISP network) or a downstream network (between customer network 12A and the destinations) may determine that a set of one or more destinations (e.g., a destination prefix) is subject to a DDoS attack. For example, an administrator for customer network 12A may determine that traffic destined to customer network 12B includes a mix of clean traffic 8 from user 4 and DDoS traffic 10 from attacker 6 (illustrated in FIG. 1 as "mixed traffic 16"). In some examples, mixed traffic may be referred to as "public traffic."

In response to this determination, the administrator may configure the network to reroute mixed traffic 16, via gateway device 22 of customer network 12A and using dirty VLAN 36, to DDoS scrubbing centers 14 via exchange point 24, which in turn switches the mixed traffic 16 to a selected DDoS scrubbing center of DDoS scrubbing centers 14 to mitigate DDoS attacks and thereby generate clean traffic, e.g., clean traffic 18. DDoS scrubbing center 14 may return, using clean VLAN 38, clean traffic 18 via exchange point 24 to gateway device 22 of customer network 12B, which in turn sends the clean traffic to its destination.

To reroute mixed traffic 16 to DDoS scrubbing centers 14, the administrator may request, via policy unit 30 of programmable network platform 120, that the one or more networks (e.g., provider edge device(s) of the networks) for DDoS scrubbing centers 14 advertise themselves to customer network 12A as a next hop for a destination of the destination prefix by, e.g., sending routing protocol route advertisements via exchange point 24 using dirty VLAN 36.

The administrator may also request, via policy unit 30, that gateway device 22 advertise itself to the one or more networks for DDoS scrubbing centers as a next hop for a destination of the destination prefix by, e.g., sending a routing protocol route advertisement via exchange point 24 using clean VLAN 38. Gateway device 22 may include a router, switch, server, firewall, or other device that forwards and receives packets between customer networks 12 and/or networks of DDoS scrubbing centers 14. In the example of FIG. 1, gateway device 22 may include a dirty virtual routing and forwarding (VRF) instance 32 ("dirty VRF 32") for routing mixed traffic 16 to DDoS scrubbing centers 14 via exchange point 24 using dirty VLAN 36. Gateway device 22 may also include a clean VRF instance 34 ("clean VRF 34") for routing clean traffic 18 received from DDoS scrubbing centers 14 via exchange point 24 using clean VLAN 38, to a target destination network, e.g., customer network 12B. In this example, gateway device 22 is colocated in colocation facility 10, but may in some examples be external to colocation facility 10 with a connection to a service provider that is colocated in colocation facility 10.

In some examples, the network is configured to reroute traffic having a destination IP prefix length between /24 (e.g., first 24 bits) and /32 (e.g., first 32 bits). In some examples, gateway device 22 and DDoS scrubbing centers 14 may use an exterior gateway protocol, e.g., eBGP, to advertise routes to reach the destination IP prefix.

In operation, when gateway device 22 receives mixed traffic 16 having a destination IP prefix including customer network 12B, gateway device 22 may reroute mixed traffic 16 to DDoS scrubbing centers 14. For example, gateway device 22 performs a lookup of a routing table of dirty VRF 32 and determines that DDoS scrubbing centers 14 is reachable via exchange point 24 using dirty VLAN 36. Gateway device 22 sends mixed traffic 16 with a VLAN ID (or VLAN tag) associated with dirty VLAN 36. When exchange point 24 receives mixed traffic 16 through dirty VLAN 36, exchange point 24 switches mixed traffic 16 to a selected DDoS scrubbing center of DDoS scrubbing centers 14. One or more DDoS scrubbing centers 14 may mitigate DDoS attacks and send clean traffic 18 to exchange point 24 using clean VLAN 38. For example, DDoS scrubbing centers 14 may send clean traffic 18 with a VLAN ID (or VLAN tag) associated with clean VLAN 38. When exchange point 24 receives clean traffic 18 through clean VLAN 38, exchange point 24 switches clean traffic 18 to gateway device 22. Gateway device 22 performs a lookup of the routing table of clean VRF 34 and determines the target destination network, e.g., customer network 12B, for which gateway device 22 is to send clean traffic 18.

Figure 2:
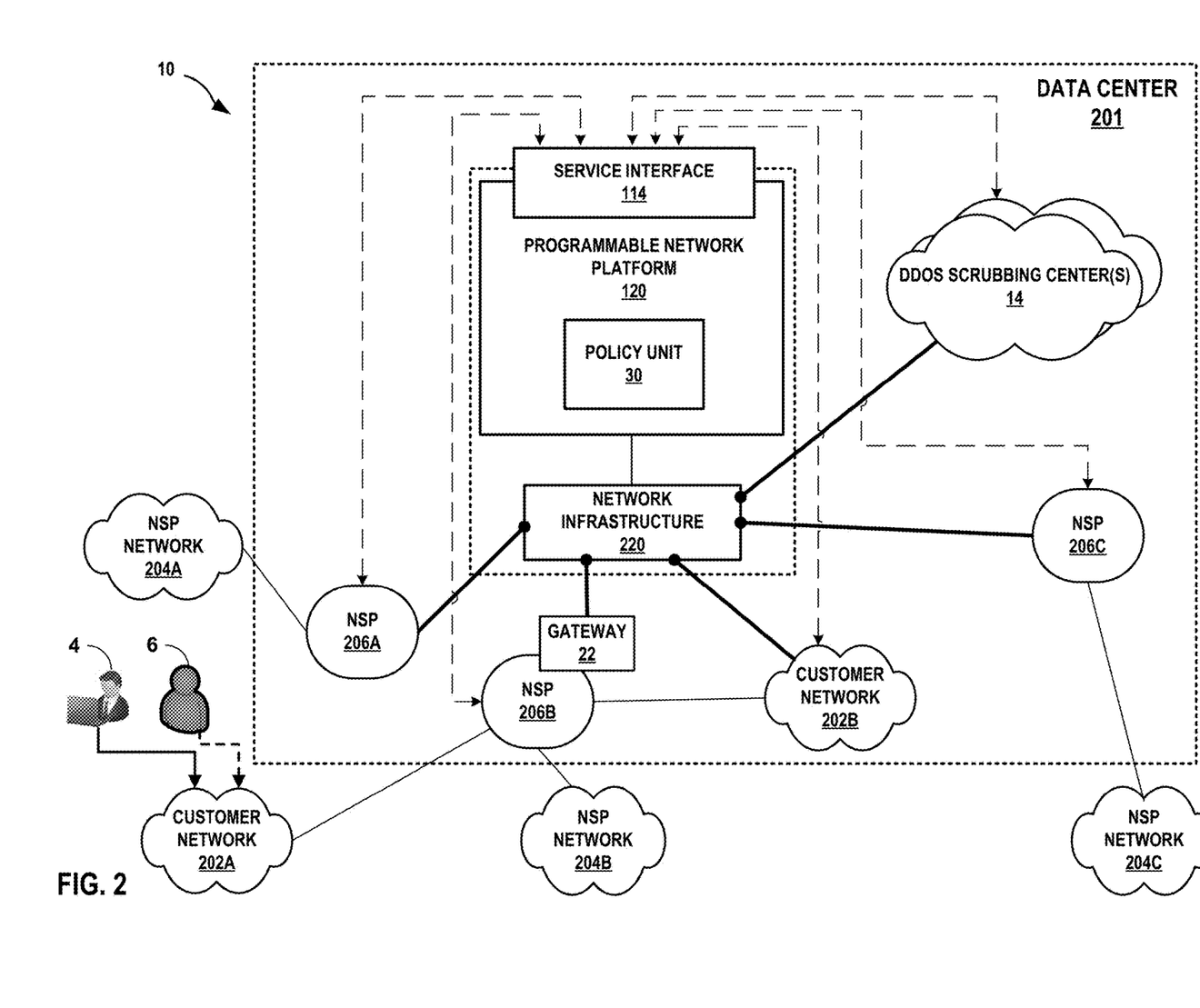
FIG. 2 is a block diagram illustrating an example data center that provides an operating environment for a colocation facility and a policy unit that provides resilient and reactive on-demand DDoS mitigation services using an exchange, in accordance with techniques of the disclosure.

FIG. 2 is a block diagram illustrating an example data center 201 that provides an operating environment for a colocation facility 10 and a policy unit 30 that provides an on-demand DDoS mitigation service, in accordance with techniques of the disclosure. Colocation facility 10 allows a corresponding one of customer networks 202A, 202B and NSP networks 204A-204C (collectively, "'private' or 'carrier' networks 204") of any NSPs 206A-206C or other customers to be directly cross-connected, via a layer 2 (L2) or layer 3 (L3) connection to any other customer network and/or to any of DDoS scrubbing centers 14, thereby allowing exchange of service traffic among the customer networks and DDoS scrubbing centers 14. Any of customer networks 202 and NSP networks 204 may represent customer networks 12 of FIG. 1. Data center 201 may be entirely located within a centralized area, such as a warehouse or localized data center complex, and provide power, cabling, security, and other services to NSPs, customers, and service providers (e.g., DDoS scrubbing centers 14) that locate their respective networks within the data center 201 (e.g., for colocation) and/or connect to the data center 201 by one or more external links.

Colocation facility 10 includes network infrastructure 220 and an operating environment by which customers 202 may receive services from one or more DDoS scrubbing centers 14 via interconnections. In the example of FIG. 2, network infrastructure 220 represents the co-location facility switching fabric and includes multiple ports that may be dynamically interconnected with switched paths by, e.g., invoking service interface 114 of the programmable network platform 120. Each of the ports is associated with NSP 206, customer 202, and DDoS scrubbing centers 14. This enables a customer to have options to create many-to-many interconnections with only a one-time hook up to the switching network and underlying network infrastructure 220 that presents an interconnection platform for co-location facility 10. In other words, instead of having to establish separate connections across transit networks to access different DDoS scrubbing centers, colocation facility 10 allows a customer to interconnect to multiple DDoS scrubbing centers 14 using network infrastructure 220 within data center 201.

An interconnection as described herein may refer to, e.g., a physical cross-connect, an Ethernet connection such as a Layer 2 VPN or virtual private LAN (e.g., E-LINE, E-LAN, E-TREE, or E-Access), an Internet exchange-based interconnection in which respective network devices (e.g., routers and/or switches) of interconnected customers directly peer and exchange layer 3 routes for service traffic exchanged via network infrastructure 220, and a cloud exchange in which customer routers peer with network infrastructure 220 (or "provider") network devices rather than directly with other customers. Colocation facility 10 may provide, to customers, interconnection services to network services, such as a DDoS mitigation service provided by DDoS scrubbing centers 14. That is, an interconnection service by colocation facility 10 provides access to a DDoS mitigation service provided by DDoS scrubbing centers 14.

For interconnections at layer 3 or above, customers 202 may receive services directly via a layer 3 peering and physical connection to one of colocation facility exchange points or indirectly via one of NSPs 206. NSPs 206 provide "transit" by maintaining a physical presence within colocation facility 10 and aggregating layer 3 access from one or more customers 202. NSPs 206 may peer, at layer 3, directly with colocation facility 10 and in so doing offer indirect layer 3 connectivity and peering to one or more customers 202 by which customers 202 may obtain services from the colocation facility 10.

In instances in which colocation facility 10 offers an internet exchange, network infrastructure 220 may be assigned a different autonomous system number (ASN). Network infrastructure 220 is thus a next hop in a path vector routing protocol (e.g., BGP) path from DDoS scrubbing centers 14 to customers 202 and/or NSPs 206. As a result, colocation facility 10 may, despite not being a transit network having one or more wide area network links and concomitant Internet access and transit policies, peer with multiple different autonomous systems via external BGP (eBGP) or other exterior gateway routing protocol in order to exchange, aggregate, and route service traffic from one or more DDoS scrubbing centers 14 to customers 202. In other words, colocation facility 10 may internalize the eBGP peering relationships that DDoS scrubbing centers 14 and customers 202 would maintain on a pair-wise basis. Instead, a customer 202 may configure a single eBGP peering relationship with colocation facility 10 and receive, via the colocation facility, multiple services from one or more DDoS scrubbing centers 14. While described herein primarily with respect to eBGP or other layer 3 routing protocol peering between colocation facility points and customer, NSP, or service provider networks, the colocation facility points may learn routes from these networks in other way, such as by static configuration, or via Routing Information Protocol (RIP), Open Shortest Path First (OSPF), Intermediate System-to-Intermediate System (IS-IS), or other route distribution protocol.

As examples of the above for a cloud exchange deployment, customer network 202B in FIG. 2 is illustrated as having contracted with the colocation facility provider for colocation facility 10 to directly access layer 3 services via colocation facility 10 and also to have contracted with NSP 206B to access layer 3 services via a transit network of NSP 206B. Customer network 202A is illustrated as having contracted with NSP 206B to access layer 3 services via a transit network of NSP 206B. The contracts described above may be instantiated in network infrastructure 220 of the colocation facility 10 by L3 peering configurations within switching devices of NSPs 206 and colocation facility 10 and L3 connections, e.g., layer 3 virtual circuits, established within colocation facility 10 to interconnect DDoS scrubbing centers 14 to NSPs 206 networks and customer 202 networks, all having at least one port offering connectivity within colocation facility 10.

In some examples, DDoS scrubbing centers may be Content Delivery Networks (CDNs) and/or cloud service providers that provide DDoS mitigation services. DDoS scrubbing centers 14 may offer DDoS mitigation services via the colocation facility 10. Network service providers 206 may each represent a network service provider that is associated with a transit network by which network subscribers of the NSP 106 may access services offered by DDoS scrubbing centers 14 via the colocation facility 10. In general, customers (e.g., customer network 202A) of DDoS scrubbing centers 14 may include network carriers, large enterprises, managed service providers (MSPs), as well as other customers generally seeking DDoS mitigation services offered by the DDoS scrubbing centers 14.

As shown in FIG. 2, network infrastructure 220 of data center 201 may provide resilient and reactive on-demand DDoS mitigation services, in accordance with techniques described in this disclosure. Network infrastructure 220 may include switch 26 of FIG. 1. As described above, the switch of network infrastructure 220 includes a dirty VLAN to switch a mix of dirty traffic from a source network, e.g., customer network 202A, to the DDoS scrubbing centers 14 and a clean VLAN to switch clean traffic from the DDoS scrubbing centers 14 to the target network, e.g., customer network 202B. For example, the switch of network infrastructure 220 may associate the dirty VLAN with a first set of ports to switch dirty traffic from gateway device 22 of NSP 206B to DDoS scrubbing centers 14. Switch 26 may also associate the clean VLAN with a second, different set of ports to switch clean traffic from DDoS scrubbing centers 14 to gateway device 22 of customer network 202B.

In the example of FIG. 2, a customer network 202A located external to data center 201 may be interconnected with other customers of colocation facility 10, e.g., customer network 202B, via NSP 206B in data center 201. In another example, a customer may be located in data center 201 and may be interconnected with other customers, service providers, and/or NSPs in data center 201. As described above, an administrator (such as an operator or software agent) of NSP 206B may determine that a set of one or more destinations (e.g., destination prefix) is subject to a DDoS attack. The administrator may invoke policy unit 30 to cause network devices (e.g., provider edge devices) of DDoS scrubbing centers 14 to advertise (e.g., using eBGP) themselves as a next hop for a destination of the destination prefix. In this way, data center 201 may provide network infrastructure 220 that offers resilient and reactive on-demand DDoS mitigation services, while facilitating clean separation and isolation between clean and dirty traffic.

Figure 3:
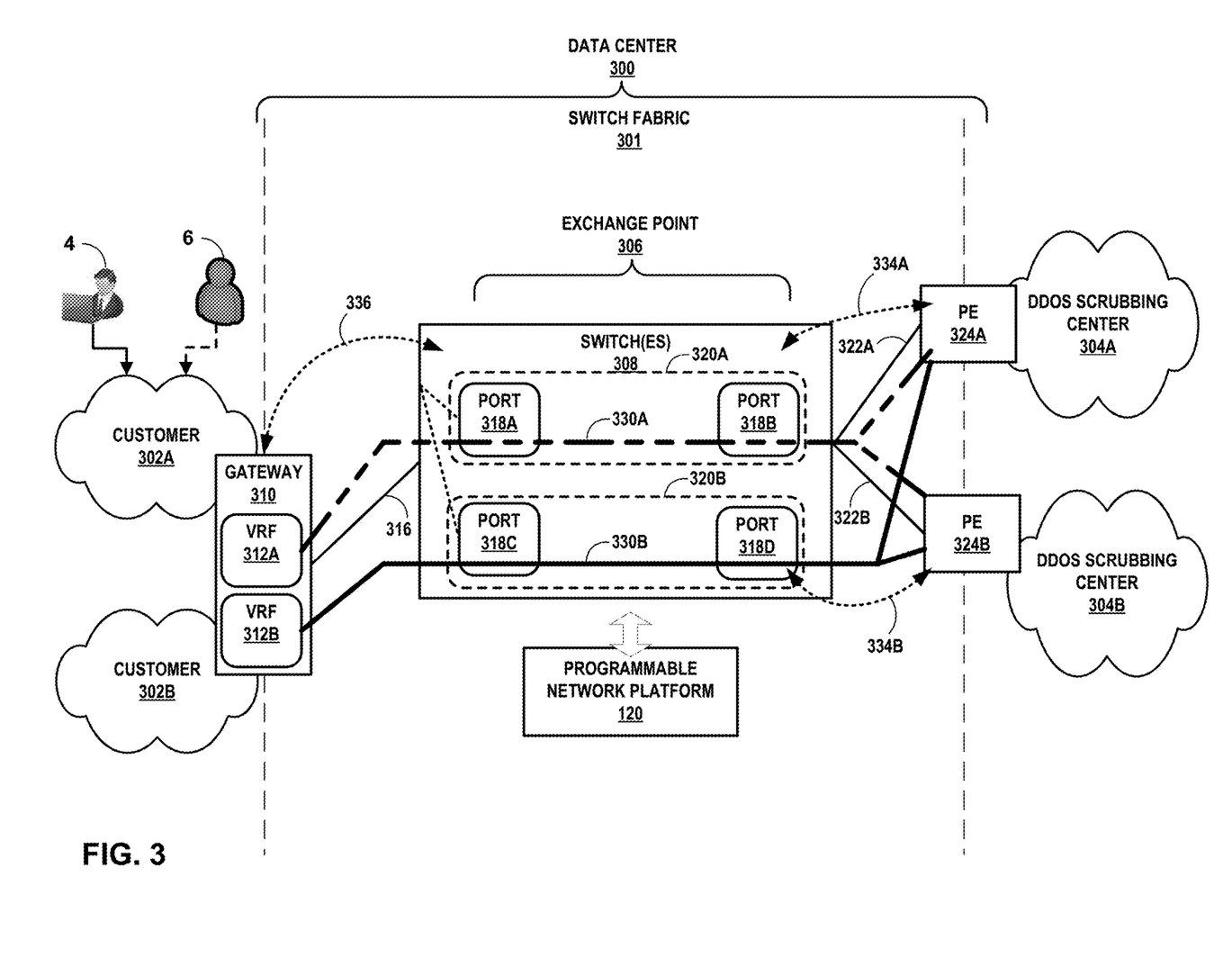
FIG. 3 is a block diagram illustrating an example of a data center-based exchange point in which network devices of an exchange are configured with separate VLAN instances for dirty and clean traffic to provide resilient and reactive on-demand DDoS mitigation services using the exchange, in accordance with techniques of the disclosure.

FIG. 3 is a block diagram illustrating an example of a data center-based exchange point in which network devices of an exchange are configured with separate VLAN instances for dirty and clean traffic to provide resilient and reactive on-demand DDoS mitigation services using the exchange, in accordance with techniques of the disclosure. In this example, exchange point 306 is configured to implement multiple switching paths 330A, 330B (collectively, "switching paths 330") to interconnect source customer network 302A and DDoS scrubbing centers 304A, 304B (collectively, "DDoS scrubbing centers 304") with end-to-end switching paths. Switching paths 330 may include public and/or private peering connections. Each of customers 302 and DDoS scrubbing centers 304 may be an endpoint for multiple switching paths 330, which multiple switching paths 330 traversing one or more attachment circuits between switch 308 and gateway device 310 and/or PE devices 324A, 324B (collectively, "PE devices 324"). A switching paths 330 represents a path through switch fabric 301 (e.g., layer 2 Ethernet switch fabric) between attachment circuit 316 connecting one or more customer networks 302 to the fabric 301 and attachment circuits 322A, 322B connecting networks of DDoS scrubbing centers 304 to the fabric 301. Although FIG. 3 is illustrated as a switch fabric, the examples described herein are also applicable to an IP/MPLS fabric in which switching path 330 represents a layer 3 path (e.g., virtual circuit) connecting attachment circuits connecting one or more customer networks 302 to the IP/MPLS fabric and attachment circuits connecting DDoS scrubbing centers 304 to the IP/MPLS fabric.

In the example of switching path 330A, PE routers 324 of DDoS scrubbing centers 304 may each send a routing protocol (e.g., eBGP) route advertisement to advertise PE routers 324 of DDoS scrubbing centers 304 as a next hop for a path to reach a destination of the destination prefix. In this example, the destination prefix may include a set of destinations, including customer network 302B. PE routers 324 of DDoS scrubbing centers 304 may advertise routing information using peering connections 334A, 334B with switch 308. Switch 308 associates a dirty VLAN 320A with ports 318A and 318B. Port 318A is connected to gateway device 310 and port 318B is connected to at least one of PE devices 324 of DDoS scrubbing centers 304. Switch 308 then exports the routes to gateway device 310 via peering connection 336 with gateway device 310. Switch 308 may export the routes specifying switch 308 as the next hop in the path. Although a single switch is described as being configured with a first set of ports (e.g., ports 318A and 318B) to switch mixed traffic using the dirty VLAN and a second set of ports (e.g., ports 318C and 318D) to switch clean traffic using the clean VLAN, any number of network devices of an exchange may be used to switch the mixed traffic and the clean traffic. For example, a first set of ports (e.g., ports 318A and 318B) of a first network device may be configured to switch mixed traffic from the one or more customer networks 302 to DDoS scrubbing centers 304 and a second, different set of ports (e.g., ports 318C and 318D) of a second network device may be configured to switch clean traffic from DDoS scrubbing centers 304 to the one or more customer networks 302. The first and second network devices may be connected via communication links in a network to switch clean traffic or dirty traffic to one another on clean and dirty VLANs configured for such links. Thus, the exchange can have ports that are or that are coupled to hardware ports of one or more network devices.

When gateway device 310 receives the routes, gateway device 310 associates the routes, which may have an associated VRF. For example, gateway device 310 is configured with dirty VRF 312A for routing mixed traffic that specifies switch 308 as the next hop. Exchange point 306 is thus an autonomous system "hop" in the path of the autonomous systems from customers 302 to DDoS scrubbing centers 304 (and vice-versa), even though the exchange point 306 may be based within a data center.

In the example of switching path 330B, gateway device 310 may send a routing protocol route advertisement to advertise gateway device 310 as a next hop for the path to reach a destination of the destination prefix. Gateway device 310 may advertise routing information using peering connection 336 with switch 308. Gateway device 310 may associate the route with clean VRF 312B to receive clean traffic from DDoS scrubbing centers 304 and to send the clean traffic to the destination of the destination prefix. For example, gateway device 310 is configured with clean VRF 312B that specifies destination customer network 302B as the next hop when receiving clean traffic from DDoS scrubbing centers 304 via switch 308. Gateway device 310 may export the route specifying gateway device 310 as the next hop in the path to switch 308. Switch 308 associates a clean VLAN 320B with ports 318C and 318D. Port 318C is connected to gateway device 310 and port 318D is connected to at least one of PE devices 324. Switch 308 then exports the route to PE devices 324 of DDoS scrubbing centers 304. PE devices 324 may specify switch 308 as the next hop in the path to destination customer network 302B. In this way, exchange point 306 "leaks" routes from DDoS scrubbing centers 304 to customer networks 302, and vice-versa, without DDoS scrubbing centers 304 and customer networks 302 requiring a direct layer peering connection. Moreover, from this configuration, a customer, e.g., customer network 302A, is able to access on-demand DDoS mitigation services using exchange point 306 which facilitates a clean separation and isolation between clean and dirty traffic. That is, this configuration in effect provides parallel exchanges for clean traffic among customer networks 302 and DDoS scrubbing centers 304 and for dirty traffic among customer networks 304 and DDoS scrubbing centers 304.

In the example of FIG. 3, when gateway device 310 receives, from a first customer network, e.g., customer network 302A, mixed traffic having a destination address within the destination IP prefix. Gateway device 310 of customer network 302A may reroute the mixed traffic to send the mixed traffic to DDoS scrubbing centers 304. Gateway device 310 that is configured with dirty VRF 312A for routing mixed traffic that specifies switch 308 as the next hop in path 330A, sends the mixed traffic to switch 308.

Exchange point 306 receives the mixed traffic via port 318A connected to gateway device 310 and associated with dirty VLAN 312. Exchange point 306 sends the mixed traffic to a selected DDoS scrubbing center of DDoS scrubbing centers 304 using dirty VLAN 320A, which associates ports 318A and 318B. For example, exchange point 24 may send the mixed traffic via port 318B connected to DDoS scrubbing centers 304 and associated with dirty VLAN 320A.

When a selected DDoS scrubbing center (e.g., DDoS scrubbing center 304A) of DDoS scrubbing centers 304 receives the mixed traffic, DDoS scrubbing center 304A performs DDoS mitigation on the mixed traffic and sends the clean traffic to exchange point 306 using clean VLAN 320B. DDoS scrubbing center 304A sends the clean traffic on route 330B using clean VLAN 320B, which specifies switch 308 as the next hop.

Exchange point 306 may receive the clean traffic, for example, via port 318D connected to DDoS scrubbing centers 304 and associated with clean VLAN 320B. Exchange point 306 sends the clean traffic to gateway device 22, for example, via port 318C connected to gateway device 310 and associated with clean VLAN 320B. Gateway device 310 receives the clean traffic from exchange point 306 and sends the clean traffic to the target destination network, e.g., customer network 302B.

Figure 4:
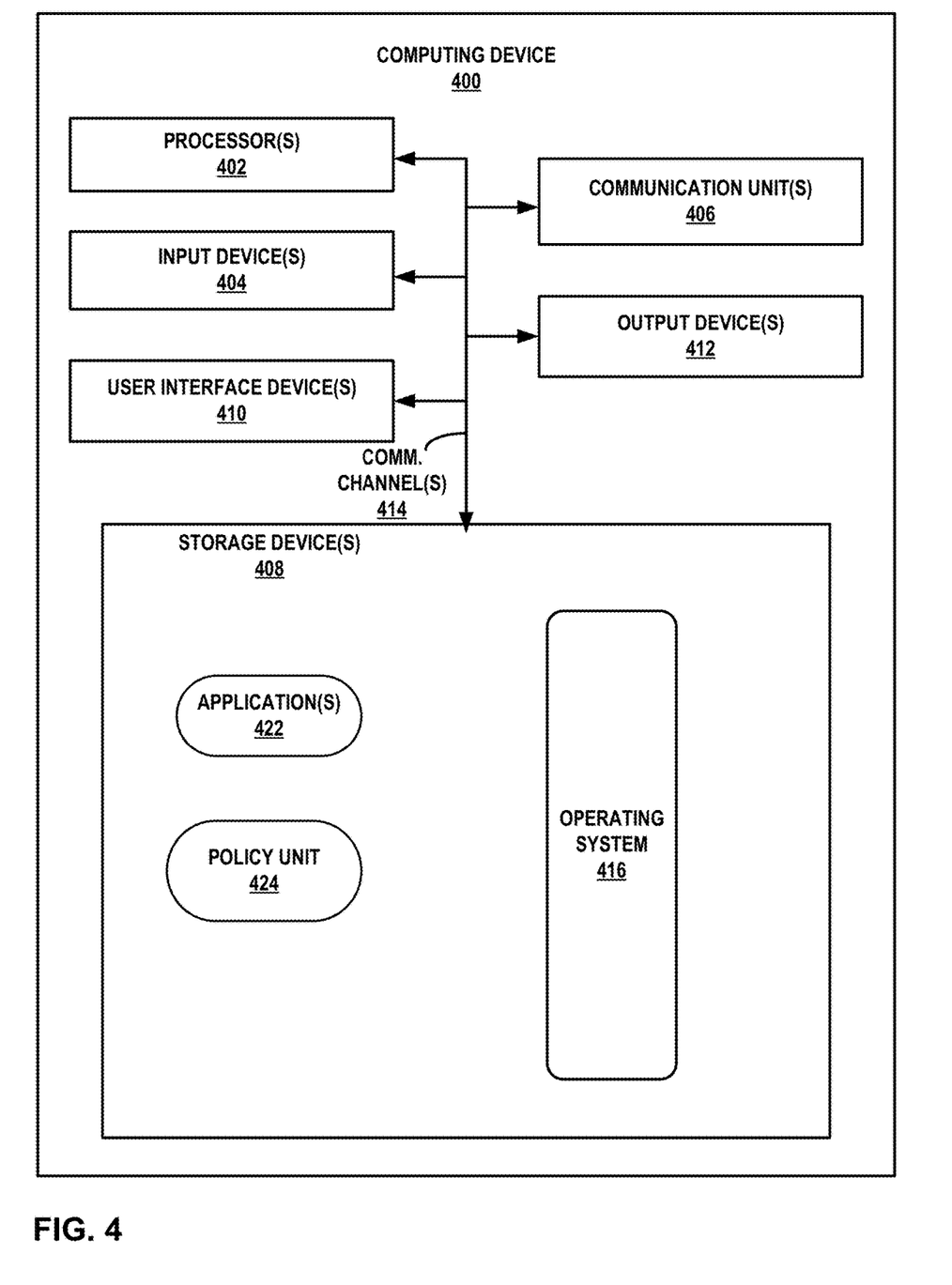
FIG. 4 is a block diagram illustrating one example of a computing device that operates in accordance with one or more techniques of the disclosure.

FIG. 4 is a block diagram illustrating one example of a computing device that operates in accordance with one or more techniques of the disclosure. FIG. 4 may illustrate a particular example of a server or other computing device 400 that includes one or more processor(s) 402 for executing policy unit 30 of FIGS. 1-3, or any other computing device described herein. Other examples of computing device 400 may be used in other instances. Although shown in FIG. 4 as a stand-alone computing device 400 for purposes of example, a computing device may be any component or system that includes one or more processors or other suitable computing environment for executing software instructions and, for example, need not necessarily include one or more elements shown in FIG. 4 (e.g., communication units 406; and in some examples components such as storage device(s) 408 may not be colocated or in the same chassis as other components). Computing device 400 may be located and execute, for example, another colocation facility, or at a branch office or cloud computing environment employed or used by a colocation facility provider.

As shown in the example of FIG. 4, computing device 400 includes one or more processors 402, one or more input devices 404, one or more communication units 406, one or more output devices 412, one or more storage devices 408, and one or more user interface (UI) devices 410. Computing device 400, in one example, further includes one or more applications 422, policy unit 424, and operating system 416 that are executable by computing device 400. Each of components 402, 404, 406, 408, 410, and 412 are coupled (physically, communicatively, and/or operatively) for inter-component communications. In some examples, communication channels 414 may include a system bus, a network connection, an inter-process communication data structure, or any other method for communicating data. As one example, components 402, 404, 406, 408, 410, and 412 may be coupled by one or more communication channels 414.

Processors 402, in one example, are configured to implement functionality and/or process instructions for execution within computing device 400. For example, processors 402 may be capable of processing instructions stored in storage device 408. Examples of processors 402 may include, any one or more of a microprocessors, a controller, a digital signal processor (DSP), an application specific integrated circuit (ASIC), a field-programmable gate array (FPGA), or equivalent discrete or integrated logic circuitry.

One or more storage devices 408 may be configured to store information within computing device 400 during operation. Storage device 408, in some examples, is described as a computer-readable storage medium. In some examples, storage device 408 is a temporary memory, meaning that a primary purpose of storage device 408 is not long-term storage. Storage device 408, in some examples, is described as a volatile memory, meaning that storage device 408 does not maintain stored contents when the computer is turned off. Examples of volatile memories include random access memories (RAM), dynamic random access memories (DRAM), static random access memories (SRAM), and other forms of volatile memories known in the art. In some examples, storage device 408 is used to store program instructions for execution by processors 402. Storage device 408, in one example, is used by software or applications running on computing device 400 to temporarily store information during program execution.

Storage devices 408, in some examples, also include one or more computer-readable storage media. Storage devices 408 may be configured to store larger amounts of information than volatile memory. Storage devices 408 may further be configured for long-term storage of information. In some examples, storage devices 508 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Computing device 400, in some examples, also includes one or more communication units 406. Computing device 400, in one example, utilizes communication units 406 to communicate with external devices via one or more networks, such as one or more wired/wireless/mobile networks. Communication units 406 may include a network interface card, such as an Ethernet card, an optical transceiver, a radio frequency transceiver, or any other type of device that can send and receive information. Other examples of such network interfaces may include 3G, 4G and WiFi radios. In some examples, computing device 400 uses communication unit 406 to communicate with an external device.

Computing device 400, in one example, also includes one or more user interface devices 410. User interface devices 410, in some examples, are configured to receive input from a user through tactile, audio, or video feedback. Examples of user interface devices(s) 410 include a presence-sensitive display, a mouse, a keyboard, a voice responsive system, video camera, microphone or any other type of device for detecting a command from a user. In some examples, a presence-sensitive display includes a touch-sensitive screen.

One or more output devices 412 may also be included in computing device 400. Output device 412, in some examples, is configured to provide output to a user using tactile, audio, or video stimuli. Output device 412, in one example, includes a presence-sensitive display, a sound card, a video graphics adapter card, or any other type of device for converting a signal into an appropriate form understandable to humans or machines. Additional examples of output device 412 include a speaker, a cathode ray tube (CRT) monitor, a liquid crystal display (LCD), or any other type of device that can generate intelligible output to a user.

Computing device 400 may include operating system 416. Operating system 416, in some examples, controls the operation of components of computing device 400. For example, operating system 416, in one example, facilitates the communication of one or more applications 422 and interconnection platform application 424 with processors 402, communication unit 406, storage device 408, input device 404, user interface device 410, and output device 412.

Application 422 may also include program instructions and/or data that are executable by computing device 400. Policy unit 424 may include instructions for causing computing device to perform the techniques described in the present disclosure with respect to policy unit 30 of FIGS. 1-3. As one example, policy unit 424 may include instructions that cause computing device 400 to instruct the one or more networks for the DDoS scrubbing centers to advertise the DDoS scrubbing centers as a next hop for a destination of the destination prefix by, e.g., sending routing protocol route advertisements via the exchange using the dirty VLAN. Moreover, policy unit 424 may include instructions that cause computing device 400 to instruct the gateway device to advertise the gateway device as a next hop for a destination of the destination prefix by, e.g., sending routing protocol route advertisements via the exchange using the clean VLAN.

Figure 5:
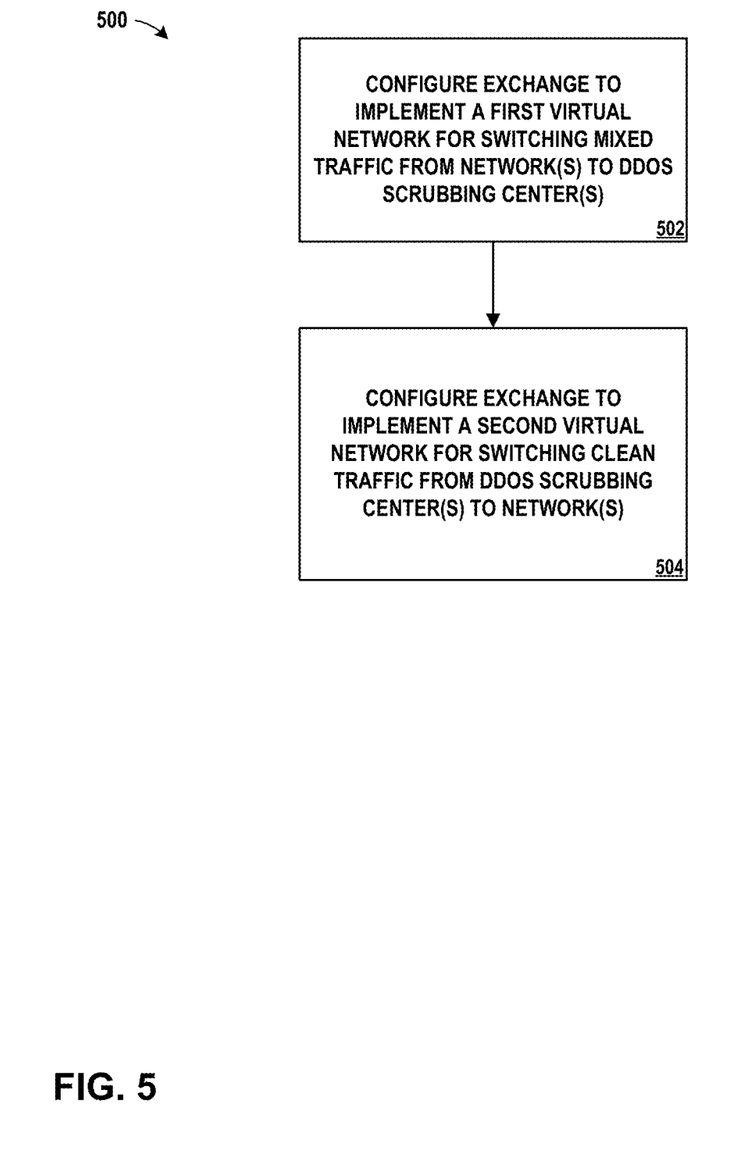
FIG. 5 is a flowchart illustrating an example mode of operation for an interconnection system providing on-demand DDoS mitigation services, in accordance with techniques of the disclosure.

FIG. 5 is a flowchart illustrating an example mode of operation 500 for an interconnection system providing on-demand DDoS mitigation services, in accordance with techniques of the disclosure. The techniques are described with respect to a colocation facility 10 of FIGS. 1-3.

In the example of FIG. 5, an administrator for a customer network (e.g., ISP network) or a downstream network (between the customer network and the destinations) may determine that a set of one or more destinations is subject to a DDoS attack. The administrator may request, e.g., via policy unit 30, for on-demand DDoS mitigation services using an exchange that is configured with separate virtual networks for clean and dirty traffic exchanged between networks and the cloud-based scrubbing services. For example, policy unit 30 configures one or more network devices of an exchange point (e.g., switch 308 of exchange point 306 of FIG. 3) to implement a first virtual network, e.g., a dirty VLAN, for switching mixed traffic from customer networks 302A to DDoS scrubbing centers 304 using dirty VLAN 330A (502). For example, policy unit 30 may cause network devices (e.g., PE devices 324) of DDoS scrubbing centers 304 to send, to customer networks 302, a routing protocol (e.g., eBGP) route advertisement specifying the PE devices 324 of DDoS scrubbing centers 304 as next hops for a path on the dirty VLAN to reach a destination of the destination IP prefix (e.g., customer network 302B). In response to receiving the route advertisement, switch 308 of exchange point 306 may associate a first set of ports (e.g., port 318A and port 318B) with dirty VLAN 320A to switch mixed traffic from customer network 302A to the DDoS scrubbing centers 304. Switch 308 of exchange point 306 then sends the route advertisement to gateway device 310, which installs a route in dirty VRF 312A to route mixed traffic from customer networks 302 to DDoS scrubbing centers 304 via switch 308 using dirty VLAN 330A. Gateway device 310 also installs a route in clean VRF 312B to route clean traffic from DDoS scrubbing centers 304, received via switch 308, to customer networks 302.

Policy unit 30 also configures switch 308 of exchange point 306 to implement a second virtual network, e.g., a clean VLAN, for switching the clean traffic from the DDoS scrubbing centers 304 to customer networks 302 using clean VLAN 330B (504). For example, policy unit 30 may cause gateway device 310 to send, to the DDoS scrubbing centers 304, a routing protocol (e.g., eBGP) route advertisement specifying gateway device 22 as a next hop for a path on the clean VLAN to reach a destination of the destination IP prefix. In response to receiving the route advertisement, switch 308 of exchange point 306 may associate a second set of ports (e.g., port 318C and port 318D) with clean VLAN 320B to switch clean traffic from DDoS scrubbing centers 304 to customer networks 302 (e.g., customer network 302B). Switch 308 of exchange point 306 then sends the route advertisement to PE devices 324, which installs a route to route clean traffic to customer networks 302 via switch 308.

Figure 6:
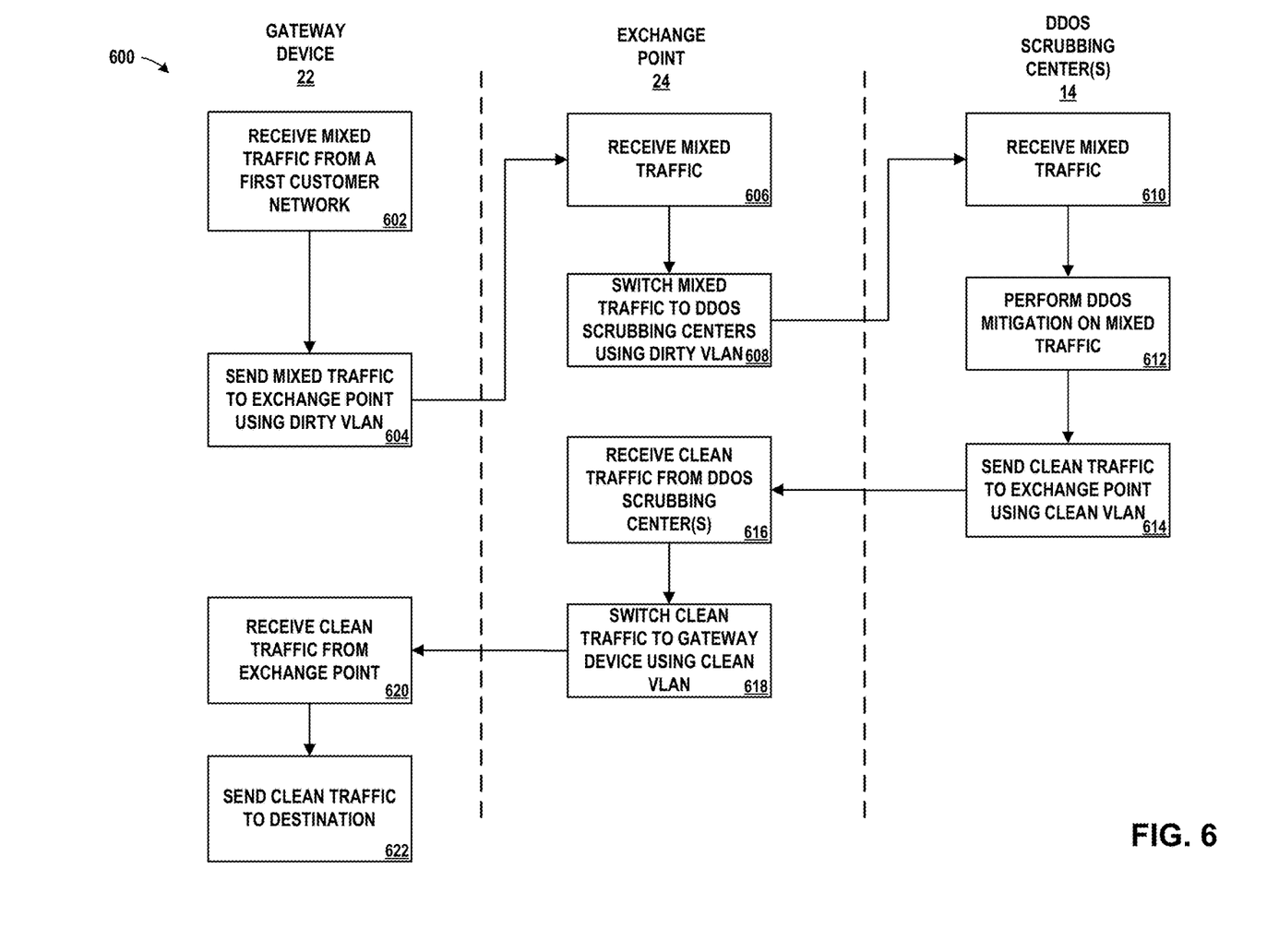
FIG. 6 is a flowchart illustrating an example operation for rerouting traffic on-demand to DDoS scrubbing centers, in accordance with techniques of the disclosure.

FIG. 6 is a flowchart illustrating an example operation 600 for rerouting traffic on-demand to DDoS scrubbing centers, in accordance with techniques of the disclosure. The techniques are described with respect to a colocation facility 10 of FIGS. 1-3.

In the example of FIG. 6, gateway device 22 may receive mixed traffic from a first customer network, e.g., customer network 12A (602). Gateway device 22 of customer network 12A may reroute the mixed traffic to send the mixed traffic to DDoS scrubbing centers 14. For example, gateway device 22 may determine from a route in dirty VRF 32 that the next hop for the destination of the destination IP prefix is a network device of DDoS scrubbing centers 14 that is reachable by switch 26 using dirty VLAN 36.

Gateway device 22 sends the mixed traffic to switch 26 of exchange point 24 (604). For example, gateway device 22 may send the mixed traffic with a VLAN ID or VLAN tag associated with dirty VLAN 36. Exchange point 24 then receives the mixed traffic (606). For example, exchange point 24 may receive the mixed traffic via a port that is connected to gateway device 22 and associated with dirty VLAN 36. Exchange point 24 switches the mixed traffic to DDoS scrubbing centers 14 using dirty VLAN 36 (608). For example, exchange point 24 may send the mixed traffic via one or more ports connected to DDoS scrubbing centers 14 and associated with dirty VLAN 36.

When a selected DDoS scrubbing center 14 receives the mixed traffic (610), the DDoS scrubbing center 14 may perform DDoS mitigation on the mixed traffic (612). DDoS scrubbing centers 14 send the clean traffic to exchange point 24 using clean VLAN 38 (614). Exchange point 24 may receive the clean traffic (616), for example, via one or more ports connected to DDoS scrubbing centers 14 and associated with clean VLAN 38. Exchange point 24 switches the clean traffic to gateway device 22 (618), for example, via a port connected to gateway device 22 and associated with clean VLAN 38. Gateway device 22 receives the clean traffic from exchange point 24 (620) and sends the clean traffic to the target destination network, e.g., customer network 12B (622). For example, gateway device 22 may receive clean traffic including a VLAN ID or VLAN tag associated with clean VLAN 38 and determine from a route in clean VRF 34 that the next hop for the destination of the destination IP prefix is customer network 12B.

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such as a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

What is claimed is:

1. An exchange comprising:
one or more network devices located in a colocation facility, wherein the one or more network devices are configured to:
provide a first virtual network for receiving mixed traffic, at the one or more network devices, from a dirty virtual routing and forwarding (VRF) instance configured in a gateway device and coupled to one or more customer networks, wherein the mixed traffic includes dirty traffic that represents Distributed Denial of Service (DDoS) traffic and clean traffic that represents non-DDoS traffic;
switch, via the first virtual network, the mixed traffic to a selected DDoS scrubbing center of one or more DDoS scrubbing centers;
provide a second virtual network for receiving, at the one or more network devices, the clean traffic from the one or more DDoS scrubbing centers, wherein the second virtual network is isolated from the first virtual network; and
switch, via the second virtual network, the clean traffic to a clean VRF instance configured in the gateway device for routing to the one or more customer networks.

2. The exchange of claim 1,
wherein the first virtual network is a dirty virtual local area network (VLAN) for switching the mixed traffic to the selected DDoS scrubbing center, and
wherein the second virtual network is a clean VLAN for switching the clean traffic to the clean VRF instance configured in the gateway device.

3. The exchange of claim 2,
wherein the dirty VLAN is associated with a first set of ports of the one or more network devices of the exchange for receiving the mixed traffic from the dirty VRF instance configured in the gateway device and coupled to the one or more customer networks and for sending the mixed traffic to the selected DDoS scrubbing center, and
wherein the clean VLAN is associated with a second set of ports of the one or more network devices of the exchange for receiving clean traffic from the one or more DDoS scrubbing centers and for sending the clean traffic to the clean VRF instance configured in the gateway device for routing to the one or more customer networks.

4. The exchange of claim 1, further comprising:
a policy unit configured to instruct one or more provider edge devices coupled to the one or more DDoS scrubbing centers to advertise, to the one or more customer networks, a first route advertisement specifying the one or more provider edge devices as a next hop for a path on the first virtual network to reach a destination of the mixed traffic,
the policy unit further configured to instruct the gateway device coupled to the one or more networks to advertise, to the one or more DDoS scrubbing centers, a second route advertisement specifying the gateway device as a next hop for a path on the second virtual network to reach a destination of the clean traffic.

5. The exchange of claim 4, wherein the one or more network devices of the exchange are further configured to:
receive, from the one or more provider edge devices of the one or more DDoS scrubbing centers, the first route advertisement;
in response to receiving the first route advertisement, associate the first virtual network with a first set of ports of the one or more network devices for receiving the mixed traffic from the dirty VRF instance configured in the gateway device and coupled to the one or more customer networks and for sending the mixed traffic to the selected DDoS scrubbing center via the one or more provider edge devices;
send, to the gateway device coupled to the one or more customer networks, the first route advertisement using the first virtual network;
receive, from the gateway device coupled to the one or more customer networks, the second route advertisement;
in response to receiving the second route advertisement, associate the second virtual network with a second set of ports of the one or more network devices for receiving the clean traffic from the one or more DDoS scrubbing centers and for sending the clean traffic to the clean VRF instance configured in the gateway device for routing to the one or more customer networks; and
send, to the one or more provider edge devices of the one or more DDoS scrubbing centers, the second route advertisement using the second virtual network.

6. The exchange of claim 5, wherein the one or more network devices of the exchange are further configured to:
wherein to receive the mixed traffic from the dirty VRF instance configured in the gateway device and coupled to the one or more customer networks, the one or more network devices are configured to receive the mixed traffic via the first set of ports associated with the first virtual network;
wherein to switch, via the first virtual network, the mixed traffic to the selected DDoS scrubbing center, the one or more network devices are configured to send the mixed traffic to the one or more provider edge devices via the first set of ports associated with the first virtual network;
wherein to receive the clean traffic from the selected DDoS scrubbing center, the one or more network devices are configured to receive the clean traffic from the selected DDoS scrubbing center via the second set of ports associated with the second virtual network; and
wherein to switch, via the second virtual network, the clean traffic to the one or more customer networks, the one or more network devices are configured to send the clean traffic to the clean VRF instance configured in the gateway device via the second set of ports associated with the second virtual network.

7. A method comprising:
configuring, by one or more processors executing a policy unit for a co-location facility including an exchange that comprises one or more network devices located in the co-location facility, the one or more network devices of the exchange to:
provide a first virtual network for receiving mixed traffic, at the one or more network devices, from a dirty virtual routing and forwarding (VRF) instance configured in the gateway device and coupled to one or more customer networks, wherein the mixed traffic includes dirty traffic that represents Distributed Denial of Service (DDoS) traffic and clean traffic that represents non-DDoS traffic;
switch, via the first virtual network, the mixed traffic to a selected DDoS scrubbing center of one or more DDoS scrubbing centers;
provide a second virtual network for receiving, at the one or more network devices, the clean traffic from the one or more DDoS scrubbing centers, wherein the second virtual network is isolated from the first virtual network; and
switch, via the second virtual network, the clean traffic to a clean VRF instance configured in the gateway device for routing to the one or more customer networks.

8. The method of claim 7,
wherein the first virtual network is a dirty virtual local area network (VLAN) for switching the mixed traffic to the selected DDoS scrubbing center, and
wherein the second virtual network is a clean VLAN for switching the clean traffic to the clean VRF instance configured in the gateway device.

9. The method of claim 8,
wherein configuring the one or more network devices of the exchange to provide the first virtual network further comprises associating the dirty VLAN with a first set of ports of the one or more network devices of the exchange for receiving the mixed traffic from the dirty VRF instance configured in the gateway device and coupled to the one or more customer networks and sending the mixed traffic to the selected DDoS scrubbing center, and
wherein configuring the one or more network devices of the exchange to provide the second virtual network further comprises associating the clean VLAN with a second set of ports of the one or more network devices of the exchange for receiving the clean traffic from the one or more DDoS scrubbing centers and sending the clean traffic to the clean VRF instance configured in the gateway device for routing to the one or more customer networks.

10. The method of claim 7, further comprising:
instructing, by the one or more processors, one or more provider edge devices coupled to the one or more DDoS scrubbing centers to advertise, to the one or more customer networks, a first route advertisement specifying the one or more provider edge devices as a next hop for a path on the first virtual network to reach a destination of the mixed traffic; and
instructing, by the one or more processors, the gateway device coupled to the one or more customer networks to advertise, to the one or more DDoS scrubbing centers, a second route advertisement specifying the gateway device as a next hop for a path on the second virtual network to reach a destination of the clean traffic.

11. The method of claim 10, further comprising:
receiving, by the one or more network devices of the exchange and from the one or more provider edge devices of the one or more DDoS scrubbing centers, the first route advertisement;
in response to receiving the first route advertisement, associating, by the one or more network devices, the first virtual network with a first set of ports of the one or more network devices for receiving the mixed traffic from the dirty VRF instance configured in the gateway device and coupled to the one or more customer networks and for sending the mixed traffic to the selected DDoS scrubbing center via the one or more provider edge devices of the one or more DDoS scrubbing centers;
sending, by the one or more network devices and to the gateway device coupled to the one or more customer networks, the first route advertisement using the first virtual network;
receiving, by the one or more network devices and from the gateway device coupled to the one or more customer networks, the second route advertisement;
in response to receiving the second route advertisement, associating, by the one or more network devices of the exchange, the second virtual network with a second set of ports of the one or more network devices for receiving the clean traffic from the one or more DDoS scrubbing centers and for sending the clean traffic to the clean VRF instance configured in the gateway device for routing to the one or more customer networks; and
sending, by the one or more network devices and to the one or more provider edge devices of the one or more DDoS scrubbing centers, the second route advertisement using the second virtual network.

12. The method of claim 7,
wherein receiving the mixed traffic from the dirty VRF instance configured in the gateway device and coupled to the one or more customer networks comprises receiving the mixed traffic via the first set of ports associated with the first virtual network;
wherein switching, via the first virtual network, the mixed traffic to the selected DDoS scrubbing center comprises sending the mixed traffic to the one or more provider edge devices via the first set of ports associated with the first virtual network;
wherein receiving the clean traffic from the selected DDoS scrubbing center comprises receiving the clean traffic from the selected DDoS scrubbing center via the second set of ports associated with the second virtual network; and
wherein switching, via the second virtual network, the clean traffic from the selected DDoS scrubbing center to the one or more customer networks comprises sending the clean traffic to the clean VRF instance configured in the gateway device via the second set of ports associated with the second virtual network.

13. A system comprising:
one or more customer networks;
one or more Distributed Denial of Service (DDoS) scrubbing centers;
an exchange comprising one or more network devices; and
a policy unit for the exchange, wherein the policy unit is configured to:

configure the one or more network devices of the exchange to:
  provide a first virtual network for receiving mixed traffic, at the one or more network devices, from a dirty virtual routing and forwarding (VRF) instance configured in a gateway device and coupled to the one or more customer networks, wherein the mixed traffic includes dirty traffic that represents Distributed Denial of Service (DDoS) traffic and clean traffic that represents non-DDoS traffic;
  switch, via the first virtual network, the mixed traffic to a selected DDoS scrubbing center of one or more DDoS scrubbing centers;
  provide a second virtual network for switching receiving, at the one or more network devices, the clean traffic from the one or more DDoS scrubbing centers, wherein the second virtual network is isolated from the first virtual network; and
  switch, via the second virtual network, the clean traffic to a clean VRF instance configured in the gateway device for routing to the one or more customer networks.

14. The system of claim 13, wherein the one or more network devices of the exchange are configured to:
  receive the mixed traffic from the dirty VRF instance configured in the gateway device and coupled to the one or more customer networks;
  switch, in response to receiving the mixed traffic, via the first virtual network, the mixed traffic to the selected DDoS scrubbing center;
  receive the clean traffic from the selected DDoS scrubbing center; and
  switch, in response to receiving the clean traffic, via the second virtual network, the clean traffic to the clean VRF instance configured in the gateway device for routing to the one or more customer networks.

15. The system of claim 13,
  wherein the first virtual network is a dirty virtual local area network (VLAN) for switching the mixed traffic to the selected DDoS scrubbing center, and
  wherein the second virtual network is a clean VLAN for switching the clean traffic to the clean VRF instance configured in the gateway device.

16. The system of claim 15, wherein the one or more network devices of the exchange are further configured to:
  associate the dirty VLAN with a first set of ports of the one or more network devices of the exchange for receiving the mixed traffic from the dirty VRF instance configured in the gateway device and coupled to the one or more customer networks and for sending the mixed traffic to the selected DDoS scrubbing center, and
  associate the clean VLAN with a second set of ports of the one or more network devices of the exchange for receiving clean traffic from the one or more DDoS scrubbing centers and for sending the clean traffic to the clean VRF instance configured in the gateway device for routing to the one or more customer networks.

17. The system of claim 13, wherein the policy unit is further configured to:
  instruct the one or more provider edge devices of the one or more DDoS scrubbing centers to advertise, to the one or more customer networks, a first route advertisement specifying the one or more provider edge devices as a next hop for a path on the first virtual network to reach a destination of the mixed traffic; and
  instruct the gateway device coupled to the one or more customer networks to advertise, to the one or more DDoS scrubbing centers, a second route advertisement specifying the gateway device as a next hop for a path on the second virtual network to reach a destination of the clean traffic.

18. The system of claim 17, wherein the one or more network devices of the exchange are further configured to:
  receive, from the one or more provider edge devices of the one or more DDoS scrubbing centers, the first route advertisement;
  in response to receiving the first route advertisement, associate the first virtual network with a first set of ports of the one or more network devices for receiving the mixed traffic from the dirty VRF instance configured in the gateway device and coupled to the one or more customer networks and for sending the mixed traffic to the selected DDoS scrubbing center via the one or more provider edge devices;
  send, to the gateway device coupled to the one or more customer networks, the first route advertisement using the first virtual network;
  receive, from the gateway device coupled to the one or more customer networks, the second route advertisement;
  in response to receiving the second route advertisement, associate the second virtual network with a second set of ports of the one or more network devices for receiving the clean traffic from the one or more DDoS scrubbing centers and for sending the clean traffic to the clean VRF instance configured in the gateway device for routing to the one or more customer networks; and
  send, to the one or more provider edge devices of the one or more DDoS scrubbing centers, the second route advertisement using the second virtual network.

19. The system of claim 17,
  wherein the dirty VRF instance configured in the gateway device is associated with the first route advertisement for routing the mixed traffic from the one or more customer networks to the one or more DDoS scrubbing centers; and
  wherein the clean VRF instance configured in the gateway device is associated with the second route advertisement for routing the clean traffic from the one or more DDoS scrubbing centers to the one or more customer networks.

20. The system of claim 19, wherein the gateway device is configured to:
  receive the mixed traffic from the one or more customer networks;
  send, in response to receiving the mixed traffic, the mixed traffic including a virtual local area network (VLAN) identifier or VLAN tag associated with the first virtual network,
  receive, from the one or more network devices of the exchange, the clean traffic including a VLAN identifier or VLAN tag associated with the second virtual network; and
  send the clean traffic to the one or more customer networks.

* * * * *